US012522962B2

(12) United States Patent
Dong

(10) Patent No.: US 12,522,962 B2
(45) Date of Patent: Jan. 13, 2026

(54) ROBOT AND METHOD FOR SEWING AN OBJECT

(71) Applicant: ABB SCHWEIZ AG, Baden (CH)

(72) Inventor: Yiming Dong, Shanghai (CN)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 18/932,906

(22) Filed: Oct. 31, 2024

(65) Prior Publication Data
US 2025/0050505 A1 Feb. 13, 2025

Related U.S. Application Data

(63) Continuation of application No. PCT/CN2022/094721, filed on May 24, 2022.

(51) Int. Cl.
*D05B 19/14* (2006.01)
*B25J 9/16* (2006.01)

(52) U.S. Cl.
CPC ............ *D05B 19/14* (2013.01); *B25J 9/1697* (2013.01)

(58) Field of Classification Search
CPC ........ D05D 19/14; D05D 19/12; D05D 57/30; D05D 69/30; D05D 55/14; B25J 18/04; B25J 11/00
See application file for complete search history.

(56) References Cited

U.S. PATENT DOCUMENTS

| | | | | |
|---|---|---|---|---|
| 4,762,455 A | * | 8/1988 | Coughlan | B25J 19/023 901/8 |
| 5,095,834 A | * | 3/1992 | Braun | D05B 3/02 112/443 |
| 5,313,897 A | * | 5/1994 | Katamine | D05B 73/00 112/470.13 |
| 5,381,743 A | * | 1/1995 | Moll | D05B 23/00 112/470.13 |
| 5,400,730 A | * | 3/1995 | Moll | D05B 59/04 112/168 |

(Continued)

FOREIGN PATENT DOCUMENTS

| | | |
|---|---|---|
| CN | 101205662 A | 6/2008 |
| CN | 204198998 U | 3/2015 |

(Continued)

OTHER PUBLICATIONS

Hu, Yang et al., "Design, Fabrication, and Testing a Semiautomatic Sewing Device for Personalized Stent Grant Manufacturing", IEEE/ASME Transactions on Mechatronics, vol. 24, No. 2, Apr. 2019, pp. 517-526.

*Primary Examiner* — Danny Worrell
(74) *Attorney, Agent, or Firm* — GREENBERG TRAURIG, LLP

(57) ABSTRACT

A robot and a method for sewing an object. The robot includes a robotic arm configured to hold a needle. The needle is tied with a thread. The robot includes a controller configured to move the needle, wherein the object includes a flexible outer surface and pre-stitches formed on the outer surface. Each of the pre-stitches includes a thread section including a top side and an opposite bottom side facing the outer surface. The controller is configured to perform a sewing operation by causing the needle to go across the thread section along a path defined between the bottom side of the thread section and the outer surface of the object.

18 Claims, 6 Drawing Sheets

(56) References Cited

U.S. PATENT DOCUMENTS

| | | | | |
|---|---|---|---|---|
| 5,875,726 | A * | 3/1999 | Keilmann | B25J 9/0084 |
| | | | | 112/475.08 |
| 5,988,085 | A * | 11/1999 | Martz | D05B 39/00 |
| | | | | 112/475.08 |
| 7,363,869 | B1 * | 4/2008 | Yang | D05B 15/02 |
| | | | | 112/62 |
| 9,512,547 | B2 * | 12/2016 | Wenzel | B60R 13/0256 |
| 10,240,271 | B2 * | 3/2019 | Freer | D05B 23/00 |
| 10,358,754 | B2 * | 7/2019 | Sano | B25J 18/04 |
| 10,450,683 | B2 * | 10/2019 | Hirayama | D05B 35/00 |
| 10,626,535 | B2 * | 4/2020 | Kadowaki | B25J 15/0019 |
| 10,738,398 | B1 | 8/2020 | Baker et al. | |
| 10,815,594 | B2 * | 10/2020 | Goto | D05B 33/00 |
| 11,174,579 | B2 * | 11/2021 | Ikadai | D05B 69/02 |
| 2025/0043477 | A1 * | 2/2025 | Dong | B25J 11/005 |

FOREIGN PATENT DOCUMENTS

| | | | | |
|---|---|---|---|---|
| CN | 110735236 | A | | 1/2020 |
| CN | 112981734 | A | | 6/2021 |
| CN | 119836496 | A * | 4/2025 | ............ D05B 19/12 |
| EP | 1944400 | A1 | | 7/2008 |
| KR | 20220028655 | A | | 3/2022 |
| WO | WO-2023225862 | A1 * | 11/2023 | ............ B25J 19/023 |

* cited by examiner

ROBOT AND METHOD FOR SEWING AN OBJECT

CROSS-REFERENCE TO RELATED APPLICATIONS

This application claims priority to and is a continuation application of international patent application number PCT/CN2022/094721, filed on May 24, 2022, which is herein incorporated by reference in its entirety.

FIELD

Embodiments of the present disclosure generally relate to a field of industrial robots, and more particularly to industrial robots for sewing an object.

BACKGROUND

In automobile industries, more and more cars are manufactured to equip with a leather covered steering wheel. The leather not only improves an outer appearance of the steering wheel but also improves comforts of hand feeling. That is because the leather cover can resist slippery caused by sweat, which means safer drive.

Typically, a leather cover is manually fixed to a blank steering wheel by a manual work. A worker firstly fixes the leather cover to the blank steering wheel by gluing and then sews the leather cover to the blank steering wheel stitch by stitch. This is labor intensive and time-consuming. For a single steering wheel, to complete this assembly process, it takes up to one hour even for an experienced operator. There is an increasing need to automate the assembly process by industrial robots.

SUMMARY

Example embodiments of the present disclosure provide a robot and a method for sewing object which can perform automatic sewing using a needle.

In a first aspect of the present disclosure, it is provided a robot for sewing an object. The robot for sewing an object comprises a robotic arm configured to hold a needle, the needle tied with a thread in advance, and a controller configured to move the needle, wherein the object includes a flexible outer surface and pre-stitches formed on the outer surface, each of the pre-stitches includes a thread section including a top side and an opposite bottom side facing the outer surface, and the controller is configured to perform a sewing operation by causing the needle to go across the thread section along a path defined between the bottom side of the thread section and the outer surface of the object.

According to the present disclosure, due to the arrangement of pre-stitches, in order to perform sewing on a soft material, the needle does not have to physically penetrate a body of the object and a sewing operation performed by the robot can be simplified. Also, since the needle is caused to go across the thread section along a path defined between the bottom side of the thread section and the outer surface of the object, scratches caused by accidental contact with the object can be further reduced. With the above arrangement, it makes it possible to perform automatic sewing on a soft and flexible material by a robot using a needle.

In some embodiments, the controller may be configured to: determine a position to be sewed which corresponds to a thread section of the pre-stitches; move the needle to a ready position at a first lateral side of the thread section which is offset from the position to be sewed by an offset distance; determine a posture of the needle such that a longitudinal axis of the needle is tangent to the outer surface of the object at which the path is located; and move the needle a first distance from the first lateral side of the thread section to a second opposite lateral side of the thread section with the needle in the determined posture to cause the needle to go across the thread section, the first distance being larger than the offset distance.

In some embodiments, the robot may further comprise a camera for capturing images of the object, wherein the position to be sewed and the tangent angle that the needle is tangent to the outer surface are determined based on the captured images.

In some embodiments, the controller may be configured to: depress the needle in a direction perpendicular to the outer surface at the ready position toward the outer surface so as to deform the outer surface of the object.

In some embodiments, the robot may further comprise a force sensor attached to the robotic arm for sensing a contact force between the needle and the object, wherein the depressing degree is determined based on the sensed contact force, the depressing degree being determined in association with a material of the object.

In some embodiments, the controller may be configured to: linearly move the needle the first distance from the first lateral side of the thread section to the second opposite lateral side of the thread section, with the needle being maintained at the depressed state.

In some embodiments, the controller may be configured to: adjust the posture of the needle to cause the tip of the needle tilting up away from the outer surface after the movement of the first distance; and move the needle a second distance with the adjusted posture.

In some embodiments, the tilting degree of the tip of the needle may be determined such that further movement of the tip does not interfere with other pre-stitches.

In some embodiments, the object may comprise a cover pre-wrapped around a steering wheel, the cover being made of leather, leatherette, or fabric.

In a first aspect of the present disclosure, it is provided a method for sewing an object. The method comprise holding a needle by a robotic arm, the needle tied with a thread in advance, and performing, by a controller, a sewing operation by causing the needle to go across a thread section from a bottom side of the thread section, wherein the object includes a flexible outer surface and pre-stitches formed on the outer surface, each of the pre-stitches includes the thread section including a top side and an opposite bottom side facing the outer surface.

In some embodiments, the method may further comprise: determine, by the controller, a position to be sewed which corresponds to a thread section of the pre-stitches; move, by the controller, the needle to a ready position at a first lateral side of the thread section which is offset from the position to be sewed by an offset distance; determine, by the controller, a posture of the needle such that a longitudinal axis of the needle is tangent to the outer surface of the object at which the thread section that the needle goes across is located; and move, by the controller, the needle a first distance from the first lateral side of the thread section to a second opposite lateral side of the thread section with the needle in the determined posture to cause the needle to go across the thread section, the first distance being larger than the offset distance.

In some embodiments, the method may further comprise: determining the position to be sewed and the tangent angle that the needle is tangent to the outer surface based on captured images captured by a camera.

In some embodiments, the method may further comprise: depressing the needle in a direction perpendicular to the outer surface at the ready position toward the outer surface so as to deform the outer surface of the object, the depressing degree being determined based on a sensed contact force by a force sensor attached to the robotic arm.

In some embodiments, the method may further comprise: linearly move the needle the first distance from the first lateral side of the thread section to the second opposite lateral side of the thread section, with the needle being maintained at the depressed state.

In some embodiments, the method may further comprise: adjust the posture of the needle to cause the tip of the needle tilting up away from the outer surface after the movement of the first distance, wherein the tilting degree of the tip of the needle is determined such that further movement of the tip does not interfere with other pre-stitches; and move the needle a second distance with the adjusted posture.

In some embodiments, the object may comprise a cover pre-wrapped around a steering wheel, the cover being made of leather, leatherette, or fabric.

DESCRIPTION OF DRAWINGS

Through the following detailed descriptions with reference to the accompanying drawings, the above and other objectives, features and advantages of the example embodiments disclosed herein will become more comprehensible. In the drawings, several example embodiments disclosed herein will be illustrated in an example and in a non-limiting manner, wherein.

Throughout the drawings, the same or similar reference symbols are used to indicate the same or similar elements.

DETAILED DESCRIPTION OF EMBODIMENTS

Figure 1:
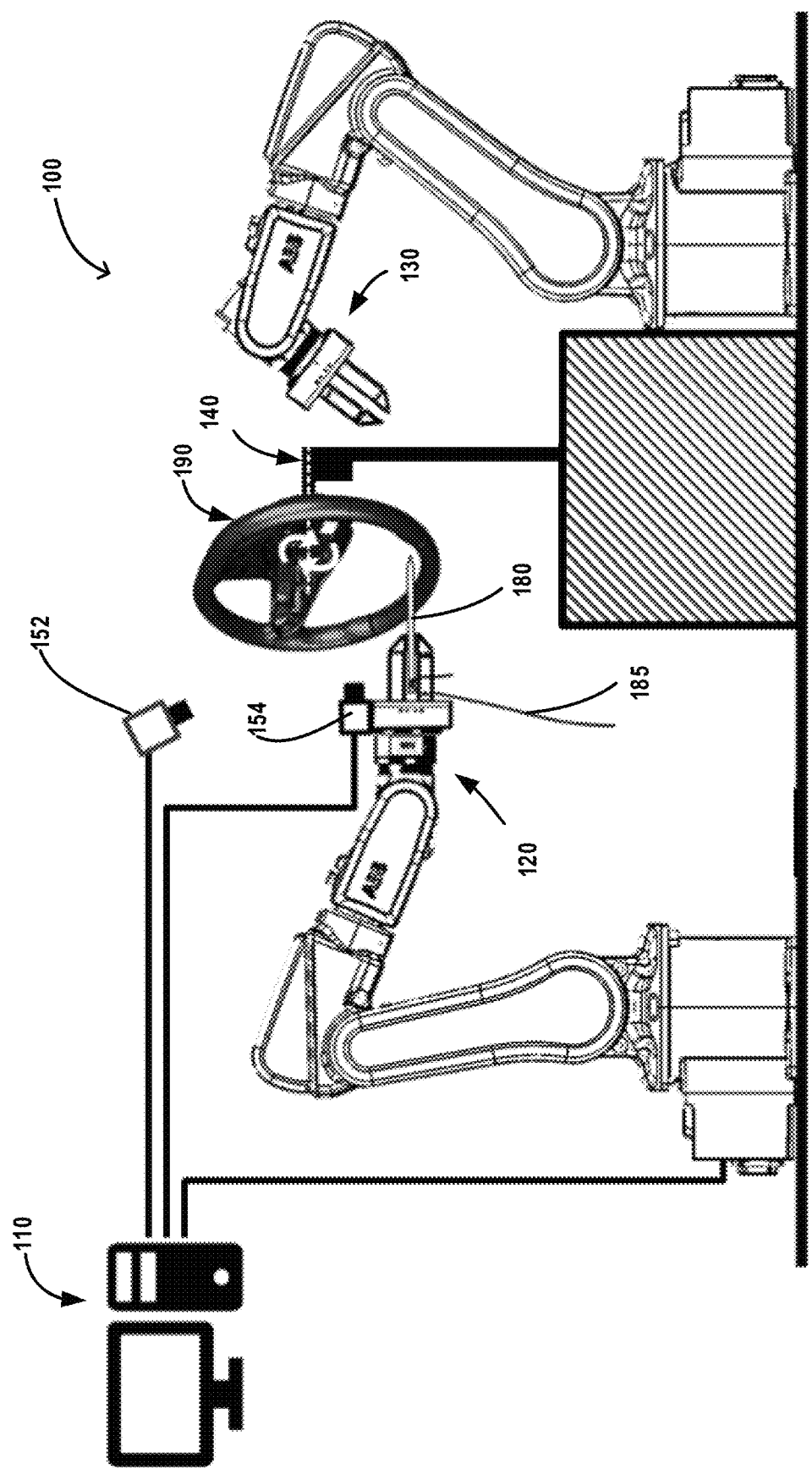
FIG. 1 is a schematic view of a robot for sewing an object according to one example embodiment of the present disclosure.

Principles of the present disclosure will now be described with reference to several example embodiments shown in the drawings. Though example embodiments of the present disclosure are illustrated in the drawings, it is to be understood that the embodiments are described only to facilitate those skilled in the art in better understanding and thereby achieving the present disclosure, rather than to limit the scope of the disclosure in any manner.

The term "comprises" or "includes" and its variants are to be read as open terms that mean "includes, but is not limited to." The term "or" is to be read as "and/or" unless the context clearly indicates otherwise. The term "based on" is to be read as "based at least in part on." The term "being operable to" is to mean a function, an action, a motion or a state that can be achieved by an operation induced by a user or an external mechanism. The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below. A definition of a term is consistent throughout the description unless the context clearly indicates otherwise.

There is an increasing need to automate the assembly process for sewing a cover to a steering wheel. The present invention proposes a novel robot system for sewing which can sew a cover onto a wheel. It is to be understood that although the present disclosure takes a steering wheel with a cover as an example to illustrate principles of the present invention, this is merely illustrative, and the inventive concepts are applicable to any other objects that needs to be sewn.

FIG. 1 shows a robot system 100 for sewing an object. As shown in FIG. 1, the robot system 100 comprises a support 140 for supporting the object to be sewed (in the shown example, a steering wheel 190, a first robotic arm 120, and a second robotic arm 130. The object may be a semi-finished product transferred from a previous process and may comprise a cover and a blank steering wheel. The cover may be primarily glued to the blank steering wheel and the cover should be further sewed according to a predetermined sewing pattern so as to tightly fix the cover onto the blank steering wheel. The robot system 100 is configured to perform the above sewing operations.

The robot system 100 further comprises a controller 110 and the controller 110 can communicate with the first robotic arm 120 and the second robotic arm 130 to control their movements so as to perform sewing operations.

The robot system 100 may further comprise one or more cameras 152, 154. The cameras 152 and 154 may be attached to different positions of the robot system so as to obtain images of the object from different perspectives. The images of the object can be sent to the controller 110. In some embodiments, the controller is configured to visually inspect the object based on the image from the cameras and to provide an inspection result indicating a suitability of whether the object can be sewed by the apparatus before the sewing operation. In some embodiments, a sewing quality after the sewing operation can be provided. In some embodiments the controller 110 is configured to identify a plural of positions to be sewed based on the image from the cameras and to generate a sewing path. The sewing path determines a sewing pattern which defines the positions to be sewed in order according to an input rule of lacing pattern based on the identified plural of positions to be sewed. According to the sewing path, the controller controls the first robotic arm 120 and the second robotic arm 130 so as to perform sewing operations. Through the plural of sewing operations, a plural of stitches are automatically formed.

The first robotic arm 120 and the second robotic arm 130 are arranged adjacent to the support 140 and thus can access the steering wheel 190 to perform sewing operations. The first robotic arm 120 and the second robotic arm 130 each comprise a gripper configured to hold the needle 180. The support 140 may comprises a shaft which is rotatable so that positions of the steering wheel 190 can be adjusted according to positions to be sewn of the steering wheel 190.

The sewing operations of the robot system 100 are illustrated as below. The first robotic arm 120 firstly holds the needle 180 and the needle 180 is tied with a length of a thread 185. The second robotic arm 130 is at a standby position. The controller 110 identifies a position to be sewed and instructs the first robotic arm 120 to move to the identified position to be sewed to cause the needle 180 to penetrate a part of the steering wheel 190. Then, the controller 110 instructs the second robotic arm 130 to hold a penetration portion of the needle 180 and pull the whole needle 180 out of the steering wheel 190 after the needle 180 being released by the first robotic arm 120.

As a material for covering a steering wheel, the cover is generally soft and has a certain flexibility to improve hand manipulation sense. In some embodiments, the cover is made of leather, leatherette, fabric and the like. On the other hand, the needle is generally with a sharp tip, which means there is a high possibility that the needle may scratch an outer surface of the cover. That means, once the sharp tip of the needle directly contacts the outer surface of the cover, there is a high possibility that the cover is penetrated by the needle, which destroys an outer appearance of the cover and reduce the quality of the product.

A sewing process thus requires that the needle has to penetrate a part of the object or the cover without scratching. The present disclosure provides a novel robot for sewing an object which is capable of penetrate a part of the cover made of flexible material free of risks of scratches. According to one example embodiment of the present disclosure, pre-stitches, for example, two rows pre-stitches are formed on the outer surface and the pre-stitches define a sewing region. Proper pre-stitches are selected and the needle is moved to penetrate these selected pre-stitches respectively. Through this process, it makes it possible to penetrate a part of the object or the cover without scratching, in particular when a sewing operation is performed on a surface of a soft material.

Figure 2:
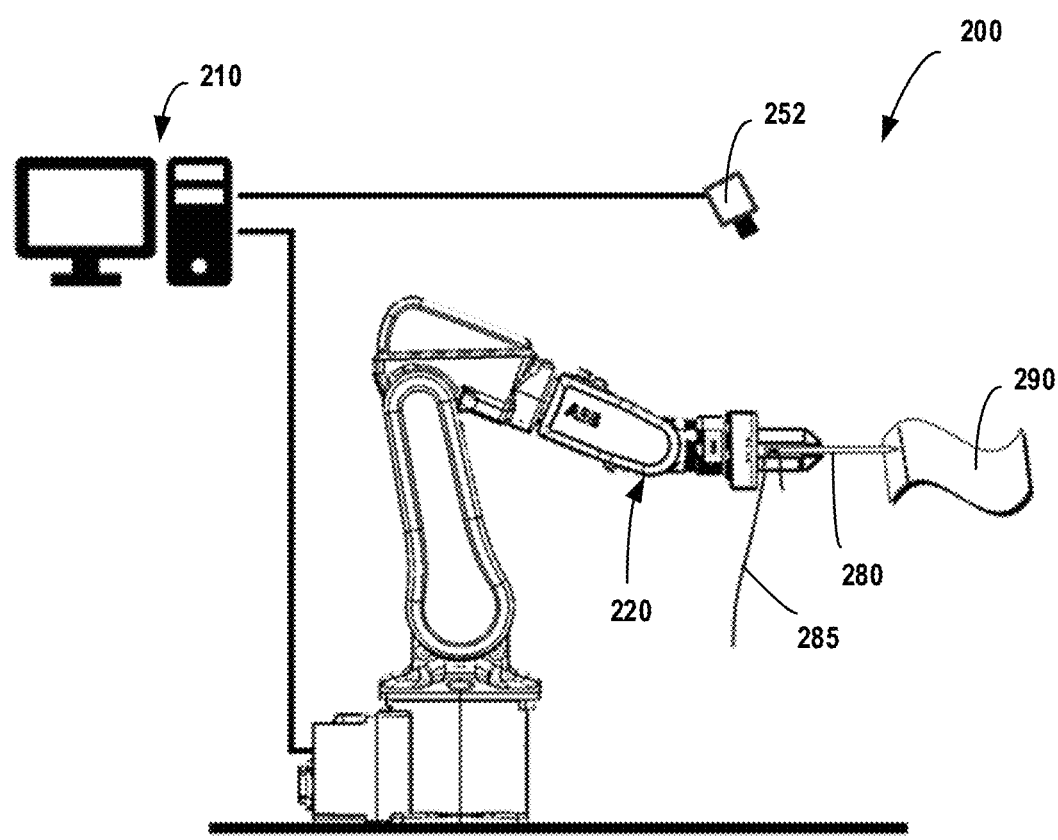
FIG. 2 is a schematic view of a robot for sewing an object according to another example embodiment of the present disclosure.

FIG. 2 shows a robot system 200 for sewing an object with a soft outer surface. As shown in FIG. 2, the robot system 200 comprises a robotic arm 220 and a controller 210. An object 290 to be sewed, for example, a leather cover, can be placed at a proper position which can be accessed by the robotic arm 220. The controller 210 can communicate with the robotic arm 220 to control its movements so as to perform sewing operations. The robotic arm 220 may comprise a gripper for holding the needle 280. A root portion of the needle includes a hole. A thread 285 goes through the hole and is tied to the needle 280. A tip portion of the needle 280 is sharp and is able to penetrate the object. In some embodiments, for example, by referring to FIGS. 3 and 5, the object 290 includes a flexible outer surface 297 and pre-stitches formed on the outer surface 297, each of the pre-stitches includes a thread section 292 including a top side 293 and an opposite bottom side 295 facing the outer surface 297. The controller 210 is configured to perform a sewing operation by causing the needle 280 to go across the thread section 292 along a path defined between the bottom side 295 of the thread section 292 and the outer surface 297 of the object 290. As the needle 280 moves by the robot and penetrates the object, the thread 285 penetrates the object accordingly. After a number of sewing operations, a number of stitches are formed on the object and the object thus is sewn by the needle 280 and the thread 285.

Figure 3:
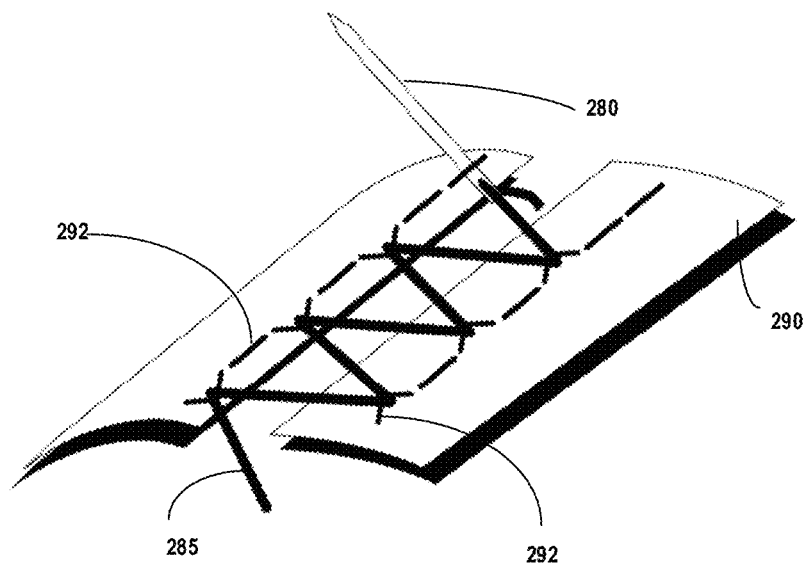
FIG. 3 is a schematic perspective view of the sewn stitches by a robot for sewing an object according to one example embodiment of the present disclosure.

FIG. 3 shows a schematic perspective view of the sewn stitches 285 by the robot 200 for sewing an object according to one example embodiment of the present disclosure. As shown in FIG. 3, two rows of pre-stitches are formed on the outer surface of the object in advance. Each of the pre-stitches includes a thread section. The thread section has a top side facing an upward direction and an opposite bottom side facing the outer surface. To perform a sewing operation, the needle is moved across the thread section along a path defined between the bottom side of the thread section and the outer surface of the object. Thus, scratches caused by the needle can be reduced since the needle does not have to penetrate a body 296 of the object 290 (also referring to FIG. 5).

Referring back to FIG. 2, the robot system 200 may further comprise one or more camera 252. The camera 252 may be attached to a proper position of the robot system and is configured to obtain images of the object. The images of the object can be sent to the controller 210. The controller 210 is configured to identify a plural of positions to be sewed, i.e., a plural of the pre-stitches, based on the image from the cameras. As the needle carrying the thread penetrates each of the selected pre-stitches, a sewn pattern is generated, as shown in FIG. 3. It is to be understood that the sewn pattern in FIG. 3 is merely illustrative, and the sewn pattern may be any other proper forms.

Figure 4:
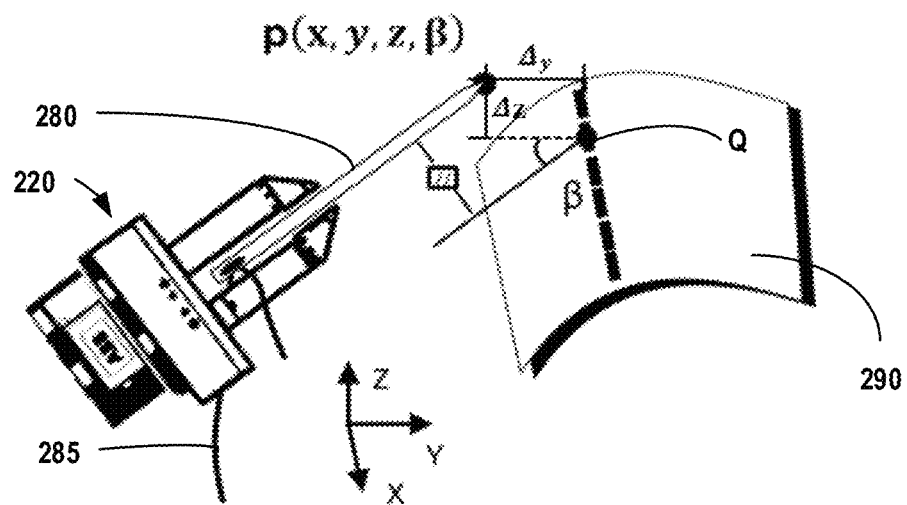
FIG. 4 is a schematic enlarged view of a portion of a robot for sewing an object according to another example embodiment of the present disclosure, showing position relationship between the needle prepared for performing a sewing operation and the object.

FIG. 4 is a schematic enlarged perspective view of a portion of a robot for sewing an object and shows a position relationship between a needle 280 held by a robotic arm 220 and the object 290 to be sewn. As shown in FIG. 4, also referring to FIG. 5, the object 290 comprises a flexible cover 294 and a body 296. In this embodiment, when the object 290 is a steering wheel, the body 296 is the black steering wheel. The flexible cover 294 may be primarily glued to the body 296. The flexible cover 294 may be provided with two rows of pre-stitches 292 and a region between the two rows of pre-stitches 292 defines a sewing region. The needle 280 carriers a length of thread 285 and can moves from one lateral side of each pre-stitch 292 to the other lateral side of each pre-stitch 292. By this movement the needle, the thread 285 also moves from one lateral side of each pre-stitch 292 to the other lateral side of each pre-stitch 292. For each selected pre-stitches 292, the needle repeats the above steps. A plural of stitches are thus formed by the thread 285. Accordingly, the cover 294 is sewed onto the body 296 by tightening the cover 294 around the body 296.

As shown in FIG. 4, the needle 280 is held by the robotic arm 220 and can be moved by the robotic arm 220. The object 290 is provided with a number of thread sections 292 of pre-stitches. The position of the needle is represented by P (x, y, z; β). In some embodiments, this position information is acquired by the controller and the associated sensors (for example, cameras). In the P (x, y, z; β), x, y, z represents the coordinates in the coordinate system, the x-y plane represents a horizontal plane that a position Q to be sewed (which corresponds to a thread section of one pre-stitch) is located on the object 290, and the z axis represents a direction perpendicular to the x-y plane. The angle β represents an angle formed by the needle tip with respect to the x-y plane. It is to be understood the P (x, y, z; β) is merely illustrative and the position of the needle tip can be represented by any other proper coordinate system. In FIG. 4, a coordinate of the needle tip is located is (x, y, z; β) and is offset by Δx, Δy, Δz with respect to the sewed position Q. The controller can use the information to control the robotic arm 220 to move the needle 280, in particular, the needle tip, to a proper position to perform sewing.

FIGS. 5-8 are schematic sectional process views illustrating a principle of how a needle is operated to penetrate the object to perform sewing according to one example embodiment of the present disclosure, showing different states of the needle with respect to the pre-stitch. FIGS. 5-8 are similar to FIG. 4 but shows a plane view of y-z plane in which the relative position between the needle and the object can be better shown.

Figure 5:
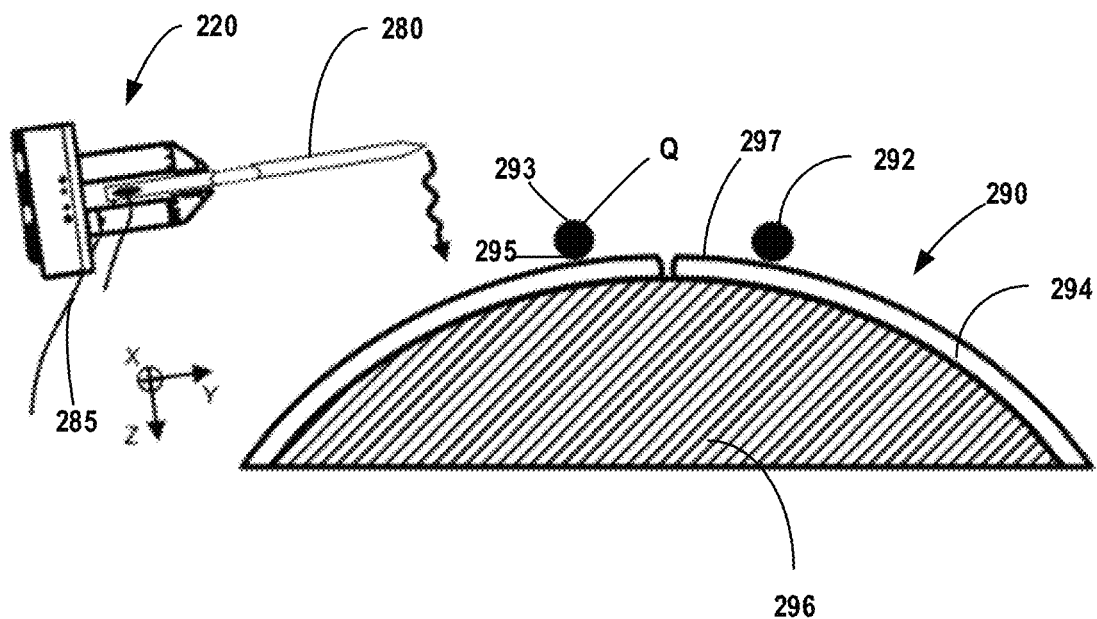
FIGS. 5-8 are schematic sectional process views illustrating a principle of how a needle is operated to penetrate the object to perform sewing according to one example embodiment of the present disclosure, showing different states of the needle with respect to the pre-stitch.

In FIG. 5, the needle is at an offset position before penetrating the object. As shown in FIG. 5, also referring to FIG. 4, the object 290 includes a cover 294 having a flexible outer surface 297 and a plural of pre-stitches (shown as a black circle dot in FIG. 5) formed on the outer surface 297. The pre-stitch each includes a thread section 292 including a top side 293 and an opposite bottom side 295 facing the outer surface 297. In order to ensure that there is no scratching, the needle 280 is controlled to go across the thread section 292 along a path defined between the bottom side 295 of the thread section 292 and the outer surface 297 of the object 290.

Assuming that the needle is to penetrate the thread section 292 (i.e., the left side one of the thread section 292) which is denoted by Q in FIG. 5. The position Q is determined, for example by the camera 252. The positon P of the needle tip is also known by the robot. Thus, relative relationship between the needle tip and the position Q is known by the controller.

A posture that the needle is to penetrate the subject is determined by the controller such that a longitudinal axis of the needle is tangent to the outer surface of the object at which the path is located. In other words, the longitudinal axis of the needle should be in the x-y plane. This means, when the needle penetrates the object or passes through the thread section 292, a direction of the needle tip is always tangent to the outer surface of the object at the positon Q. With these measures, the orientation of the needle tip can be precisely controlled and scratches caused by the needle tip are reduced.

Once the above parameters are determined, the robotic arm 220 is lowered onto the object 290 and moves the needle a first distance from the first lateral side of the thread section 292 to a second opposite lateral side of the thread section with the needle in the determined posture to cause the needle to go across the thread section. In this way, the needle can penetrate the thread section 292 with less or without scratches. In some embodiments, the first distance is larger than the offset distance. This ensures that the needle does penetrate the thread section 292.

Figure 6:
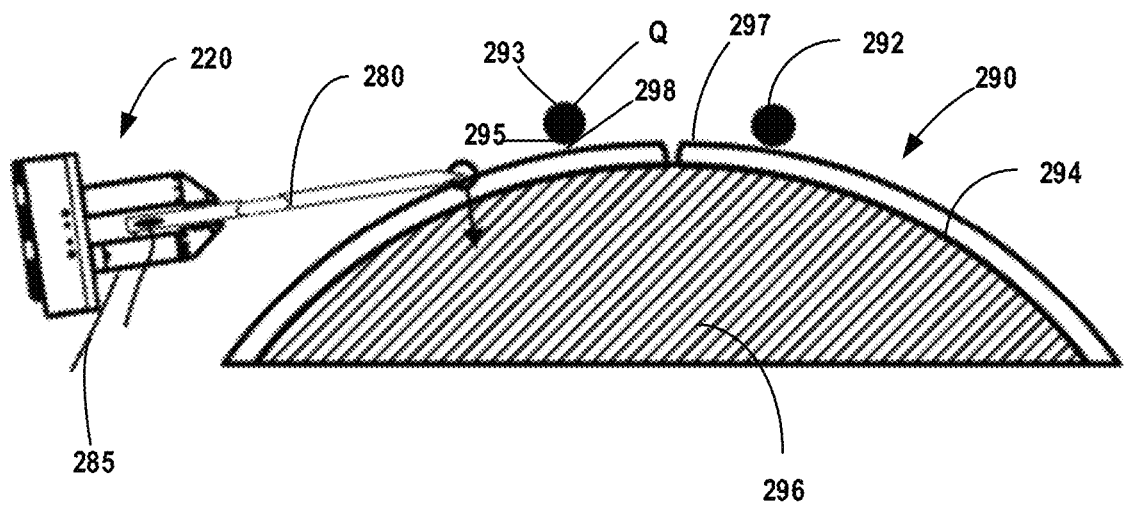

In some embodiments, the needle is depressed in a direction perpendicular to the outer surface at the ready position toward the outer surface so as to deform the outer surface of the object. As shown in FIG. 6, the needle is at a ready position before penetrating the object and the needle is away from the position Q by the first distance. Also, the needle tip is tangent to the outer surface of the object at the positon Q. In FIG. 6, when the needle is depressed in a direction perpendicular to the outer surface toward the outer surface, a gap 298 is formed between the bottom side 295 of the thread section 292 and the outer surface 297 of the object 290. By depressing the outer surface of the object in a z-direction, a gap 298 can be formed between the bottom side 295 of the thread section 292 and the outer surface 297 of the object 290. Due to the generated gap 298, there are no scratches when the needle passes the thread section 292. The scratches caused by the needle tip can thus be completely obviated.

It is to be understood that this is merely illustrative rather than limited. In some embodiments, the step of depressing the needle can be omitted. For example, when a slight gap is initially formed between the thread section of the pre-stitch and the outer surface of the object and the needle can penetrate this slight gap, it may not be necessary to depress the needle.

In some embodiments, the robot may further comprise a force sensor attached to the robotic arm. The force sensor is configured to sense a contact force between the needle and the object. In this way, the depressing degree is determined based on the sensed contact force. In some embodiments, the depressing degree is determined in association with a material property of the object, for example, a hardness of the cover. With the force sensor, the force for deforming the outer surface of the object can be precisely controlled.

Figure 7:
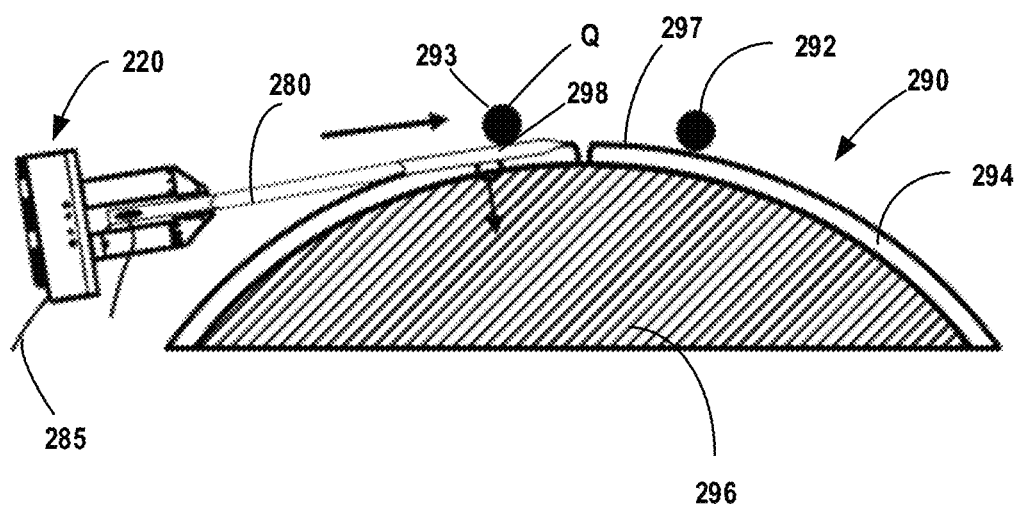

As shown in FIGS. 6 and 7, the needle 280 is linearly moved by the first distance from the first lateral side of the thread section to the second opposite lateral side of the thread section, with the needle being maintained at the depressed state. The needle passes the thread needle without barrier.

Figure 8:
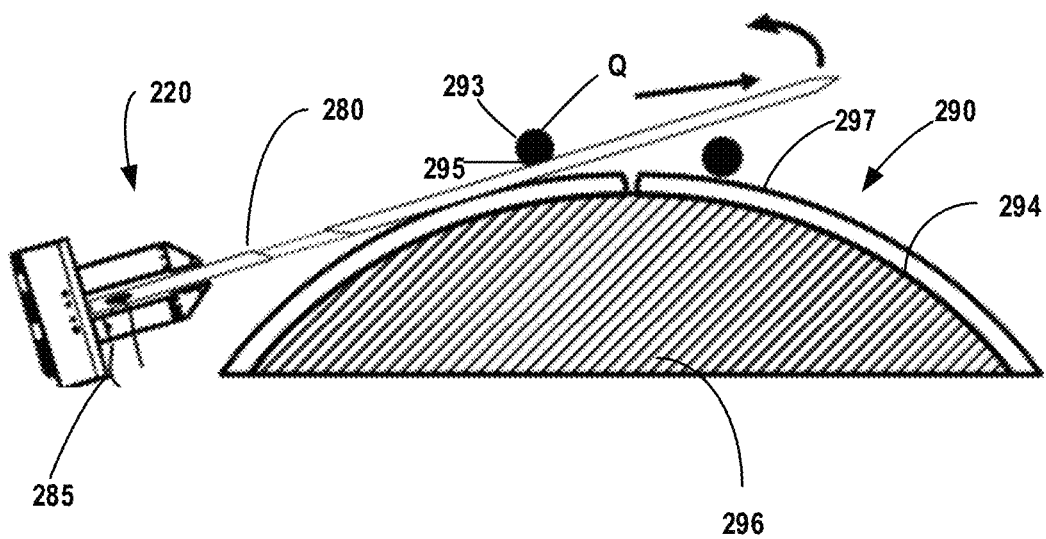

In some embodiments, as shown in FIG. 8, the posture of the needle may be further adjusted to cause the tip of the needle tilting up away from the outer surface after the movement of the first distance. For example, the posture of the needle may be adjusted by rotating the needle, as shown by an arrow in FIG. 8. In some embodiments, the tilting degree of the tip of the needle is determined such that further movement of the tip does not interfere with other pre-stitches. Then, the needle is moved by a second distance with the adjusted posture. At the second distance, the needle can be pulled out for example, by a robotic arm or any other proper devices. Accordingly, the sewing operation for one stitch is realized. It is to be understood that adjusting the posture of the needle is merely illustrative rather than limited. In some embodiments, if the movement of the needle tip does not interfere with other pre-stitches, this step can be obviated.

Figure 9:
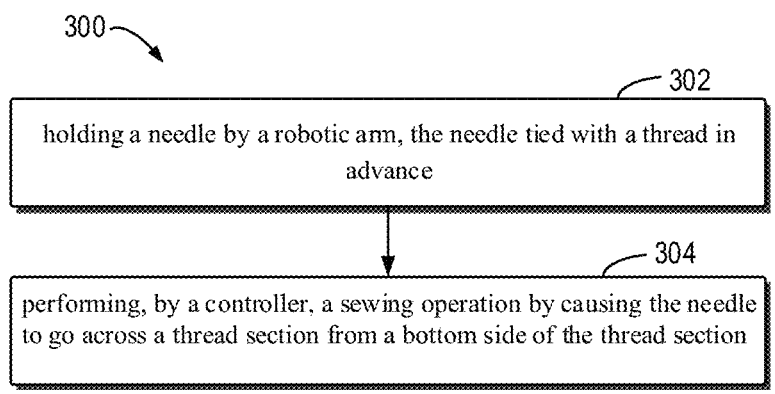
FIG. 9 is a flow chart of a method for sewing an object according to one example embodiment of the present disclosure.

FIG. 9 is a flow chart of a method 300 for sewing an object according to one example embodiment of the present disclosure. As shown in FIG. 9, the method 300 comprises the following actions. At a block 302, a needle is held by a robotic arm, wherein the needle is tied with a thread in advance. At a block 304, the needle is moved, for example, by a controller, to go across a thread section from a bottom side of the thread section. The object includes a flexible outer surface and pre-stitches formed on the outer surface, each of the pre-stitches includes the thread section including a top side and an opposite bottom side facing the outer surface. With the arrangement of pre-stitches, the method of the present disclosure can easily penetrate an object made of a soft material.

In some embodiments, a position to be sewed which corresponds to a thread section of the pre-stitches is determined. The needle is moved to a ready position at a first lateral side of the thread section which is offset from the position to be sewed by an offset distance. A posture of the needle is determined such that a longitudinal axis of the needle is tangent to the outer surface of the object at which the thread section that the needle goes across is located. The needle is moved by a first distance from the first lateral side of the thread section to a second opposite lateral side of the thread section with the needle in the determined posture to cause the needle to go across the thread section, the first distance being larger than the offset distance. With this arrangement, the scratches caused by the needle tip can be reduced.

In some embodiments, the position to be sewed and the tangent angle that the needle is tangent to the outer surface may be determined based on captured images captured by a camera. In this way, the position to be sewed and the tangent angle can be determined easily. It is to be understood that this is merely illustrative rather than limited and any other proper means can be used to determine the position to be sewed and the tangent angle.

In some embodiments, the needle may be depressed in a direction perpendicular to the outer surface at the ready position toward the outer surface so as to deform the outer surface of the object, the depressing degree being determined based on a sensed contact force by a force sensor attached to the robotic arm. In this way, the scratches caused by the needle tip can be minimized.

In some embodiments, the needle may be linearly moved by the first distance from the first lateral side of the thread section to the second opposite lateral side of the thread section, with the needle being maintained at the depressed state. By a linear movement, the posture of the needle can be well maintained to avoid the needle tip from shaking.

In some embodiments, the posture of the needle may be adjusted to cause the tip of the needle tilting up away from the outer surface after the movement of the first distance, wherein the tilting degree of the tip of the needle is determined such that further movement of the tip does not interfere with other pre-stitches. The needle is moved by a second distance with the adjusted posture. This is particularly advantageous when the pre-stitches are arranged adjacent to each other.

In some embodiments, the object may comprise a cover pre-wrapped around a steering wheel, the cover being made of leather, leatherette, or fabric.

Through the teachings provided herein in the above description and relevant drawings, many modifications and other embodiments of the disclosure given herein will be appreciated by those skilled in the art to which the disclosure pertains. Therefore, it is understood that the embodiments of the disclosure are not limited to the specific embodiments of the disclosure, and the modifications and other embodiments are intended to fall within the scope of the disclosure. In addition, while exemplary embodiments have been described in the above description and relevant drawings in the context of some illustrative combinations of components and/or functions, it should be realized that different combinations of components and/or functions can be provided in alternative embodiments without departing from the scope of the disclosure. In this regard, for example, it is anticipated that other combinations of components and/or functions that are different from the above definitely described will also fall within the scope of the disclosure. While specific terms are used herein, they are only used in a general and descriptive sense rather than limiting.

What is claimed is:

1. A robot for sewing an object, comprising;
    a robotic arm configured to hold a needle, the needle tied with a thread in advance; and
    a controller configured to:
        move the needle,
        wherein the object includes a flexible outer surface and pre-stitches formed on the outer surface, each of the pre-stitches includes a thread section including a top side and an opposite bottom side facing the outer surface;
        perform a sewing operation by causing the needle to go across the thread section along a path defined between the bottom side of the thread section and the outer surface of the object;
        determine a position to be sewed which corresponds to a thread section of the pre-stitches;
        move the needle to a ready position at a first lateral side of the thread section which is offset from the position to be sewed by an offset distance;
        determine a posture of the needle such that a longitudinal axis of the needle is tangent to the outer surface of the object at which the path is located; and
        move the needle a first distance from the first lateral side of the thread section to a second opposite lateral side of the thread section with the needle in the determined posture to cause the needle to go across the thread section, the first distance being larger than the offset distance.

2. The robot according to claim 1, further comprising a camera for capturing images of the object, wherein the position to be sewed and the tangent angle that the needle is tangent to the outer surface are determined based on the captured images.

3. The robot according to claim 1, wherein the controller is configured to:
    depress the needle in a direction perpendicular to the outer surface at the ready position toward the outer surface so as to deform the outer surface of the object.

4. The robot according to claim 3, further comprising a force sensor attached to the robotic arm for sensing a contact force between the needle and the object, wherein the depressing degree is determined based on the sensed contact force, the depressing degree being determined in association with a material of the object.

5. The robot according to claim 3, wherein the controller is configured to:
    linearly move the needle the first distance from the first lateral side of the thread section to the second opposite lateral side of the thread section, with the needle being maintained at the depressed state.

6. The robot according to claim 3, wherein the controller is configured to:
    adjust the posture of the needle to cause the tip of the needle tilting up away from the outer surface after the movement of the first distance; and
    move the needle a second distance with the adjusted posture.

7. The robot according to claim 6, wherein the tilting degree of the tip of the needle is determined such that further movement of the tip does not interfere with other pre-stitches.

8. The robot according to claim 1, wherein the object comprises a cover pre-wrapped around a steering wheel, the cover being made of leather, leatherette, or fabric.

9. A method for sewing an object, comprising:
    holding a needle by a robotic arm, the needle tied with a thread in advance;
    performing, by a controller, a sewing operation by causing the needle to go across a thread section from a bottom side of the thread section,
        wherein the object includes a flexible outer surface and pre-stitches formed on the outer surface, each of the pre-stitches includes the thread section including a top side and an opposite bottom side facing the outer surface;

determining, by the controller, a position to be sewed which corresponds to a thread section of the pre-stitches;

moving, by the controller, the needle to a ready position at a first lateral side of the thread section which is offset from the position to be sewed by an offset distance;

determining, by the controller, a posture of the needle such that a longitudinal axis of the needle is tangent to the outer surface of the object at which the thread section that the needle goes across is located; and moving, by the controller, the needle a first distance from the first lateral side of the thread section to a second opposite lateral side of the thread section with the needle in the determined posture to cause the needle to go across the thread section, the first distance being larger than the offset distance.

10. The method according to claim 9, further comprising: determining the position to be sewed and the tangent angle that the needle is tangent to the outer surface based on captured images captured by a camera.

11. The method according to claim 10, further comprising:

depressing the needle in a direction perpendicular to the outer surface at the ready position toward the outer surface so as to deform the outer surface of the object, the depressing degree being determined based on a sensed contact force by a force sensor attached to the robotic arm.

12. The method according to claim 11, further comprising linearly moving the needle the first distance from the first lateral side of the thread section to the second opposite lateral side of the thread section, with the needle being maintained at the depressed state.

13. The method according to claim 11, further comprising:

adjusting the posture of the needle to cause the tip of the needle tilting up away from the outer surface after the movement of the first distance, wherein the tilting degree of the tip of the needle is determined such that further movement of the tip does not interfere with other pre-stitches; and moving the needle a second distance with the adjusted posture.

14. The method according to claim 9, wherein the object comprises a cover pre-wrapped around a steering wheel, the cover being made of leather, leatherette, or fabric.

15. The method according to claim 9, wherein the object comprises a cover pre-wrapped around a steering wheel, the cover being made of leather, leatherette, or fabric.

16. The method according to claim 10, wherein the object comprises a cover pre-wrapped around a steering wheel, the cover being made of leather, leatherette, or fabric.

17. The method according to claim 11, wherein the object comprises a cover pre-wrapped around a steering wheel, the cover being made of leather, leatherette, or fabric.

18. The method according to claim 12, wherein the object comprises a cover pre-wrapped around a steering wheel, the cover being made of leather, leatherette, or fabric.

* * * * *